United States Patent [19]

Patriquin et al.

[11] Patent Number: 5,709,244
[45] Date of Patent: Jan. 20, 1998

[54] COLLAPSIBLE CONTAINER CONNECTOR

[75] Inventors: Lawrence J. Patriquin, Phillips Ranch; Rory F. Ramirez, Yuba City, both of Calif.

[73] Assignee: Condiment Master, Inc., Los Angeles, Calif.

[21] Appl. No.: 539,997

[22] Filed: Oct. 6, 1995

[51] Int. Cl.⁶ ............................................. F16L 37/28
[52] U.S. Cl. ............................................. 137/614.04
[58] Field of Search ................ 137/614.04, 614.02; 251/149.5, 149.6, 149.3, 366, 367; 222/92, 105, 501, 522

[56] References Cited

U.S. PATENT DOCUMENTS

| | | |
|---|---|---|
| 4,484,697 | 11/1984 | Fry, Jr. . |
| 4,564,132 | 1/1986 | Lloyd-Davies ............... 137/614.04 X |
| 5,072,756 | 12/1991 | Carr ............................ 137/614.04 |
| 5,366,117 | 11/1994 | Mesenbring et al. . |
| 5,467,806 | 11/1995 | Stricklin et al. ............. 137/614.04 X |

OTHER PUBLICATIONS

Scholle Corporation brochure, Scholle Bag-in-Box Post Mix Quick Disconnect, 1984.
CPC brochure, Thermoplastic Quick Couplings, pp. 16 and 17.
Liqui-Box article, Food Service Technology Break Through Development for Operators.

*Primary Examiner*—Kevin Lee
*Attorney, Agent, or Firm*—Pretty, Schroeder & Poplawski

[57] ABSTRACT

A connector for a collapsible container having a container outlet fitting, the connector including a container cap for mounting on a container outlet fitting, a coupling insert for attaching to the container cap, and a coupling body, with the coupling insert and coupling body having interengaging means for connecting the body to the insert and for disconnecting the body from the insert, with the coupling body having an outer end for connection to a hose line. The container cap has a flange with a threaded opening and the coupling insert has a threaded end for mounting in the container cap flange, and the container cap further has a first annular rim projecting from the flange for insertion into a container outlet fitting.

2 Claims, 4 Drawing Sheets

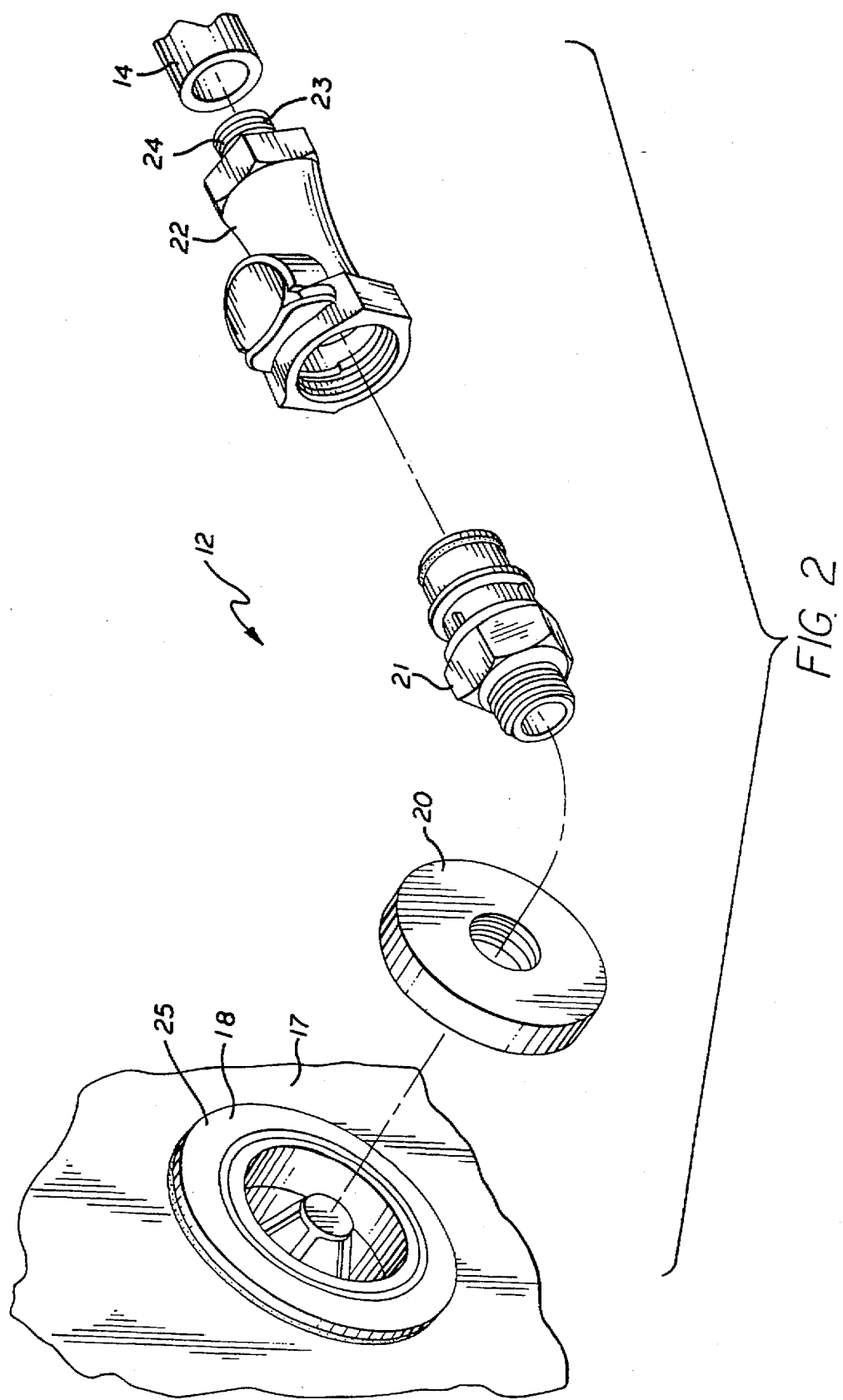

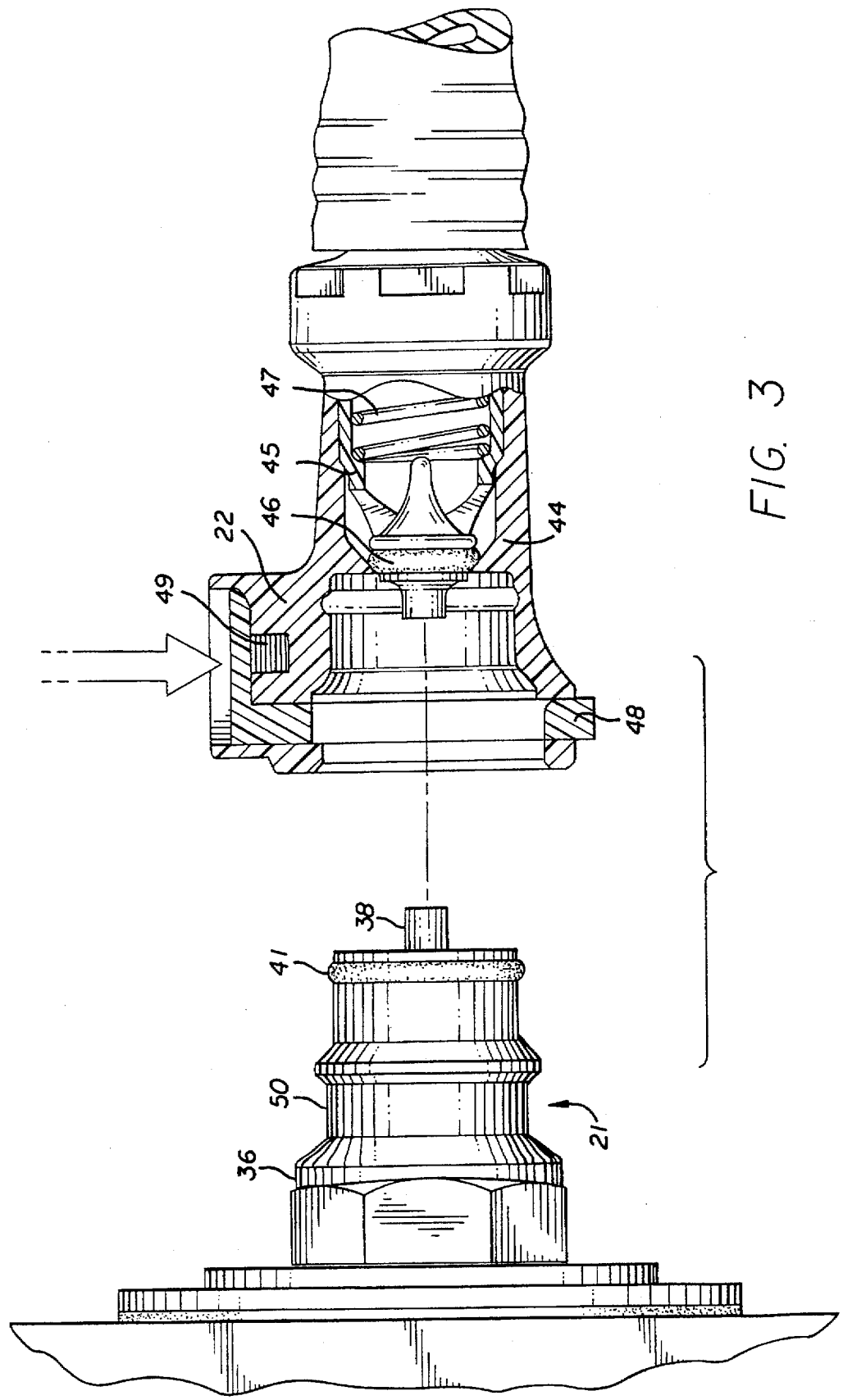

COLLAPSIBLE CONTAINER CONNECTOR

BACKGROUND OF THE INVENTION

This invention relates to connectors for dispensing condiments from plastic bags and the like, and more importantly to a new and improved connector suitable for use with pumping systems for dispensing condiments from conventional collapsible bags.

Ketchup, mustard and similar condiments are currently available in plastic bags. The bags either hang freely in a hanger or are positioned in a box. In the conventional product, the contents are withdrawn from the container by gravity. The product is delivered in the collapsible container, with a container outlet fitting closed by a conventional cap. In use, the cap is removed and a valve of some nature is attached to the container outlet fitting. Condiment is withdrawn by opening the valve, with the condiment flowing by gravity into smaller containers for dispensing or directly onto the food product. The control valve may be mounted directly on the container or on the container through a flexible hose or other pipeline. The bag with the conventional container outlet fitting is relatively inexpensive.

It is often desired to withdraw the contents of the collapsible bag by pressure or vacuum, typically $CO_2$ or compressed air or some form of pumping. In the past, this has been accomplished by producing the collapsible container with a special container outlet fitting which will accommodate the pressure or vacuum system.

With this type of operation, the supplier of the condiment materials must provide the product in two types of containers, for gravity flow and for pressure or vacuum flow, with the corresponding resultant increase in cost for the special container outlet fittings and the costs resulting from the need to fill, store and distribute two different types of collapsible container.

It is an object of the present invention to provide a new and improved connector for collapsible condiment containers which connector can be utilized with the conventional container gravity type outlet fitting for operation with pump type dispensing.

Other objects, advantages, features and results will more fully appear in the course of the following description.

SUMMARY OF THE INVENTION

The preferred embodiment of the connector for a collapsible container having a container outlet fitting includes a container cap having means for mounting the cap on a container outlet fitting, a coupling insert for attaching to the container cap, and a coupling body, with the coupling insert and coupling body having interengaging means for connecting the body to the insert and for disconnecting the body from the insert, with the coupling body having an outer end for connection to a hose line. Further in the preferred embodiment the container cap has a flange with a threaded opening and the coupling insert has a threaded end for mounting in the container cap flange, and the container cap has a first annular rim projecting from the flange for insertion into a container outlet fitting. Further the container cap has a second annular rim concentric with the first annular rim and defining an annular slot for engagement with a container outlet fitting.

BRIEF DESCRIPTION OF THE DRAWINGS

FIG. 2 is an enlarged and exploded view of the connector utilized in the system of FIG. 1;

FIG. 3 is an enlarged view showing the connector with the pump line disconnected;

DESCRIPTION OF THE PREFERRED EMBODIMENTS

Figure 1:
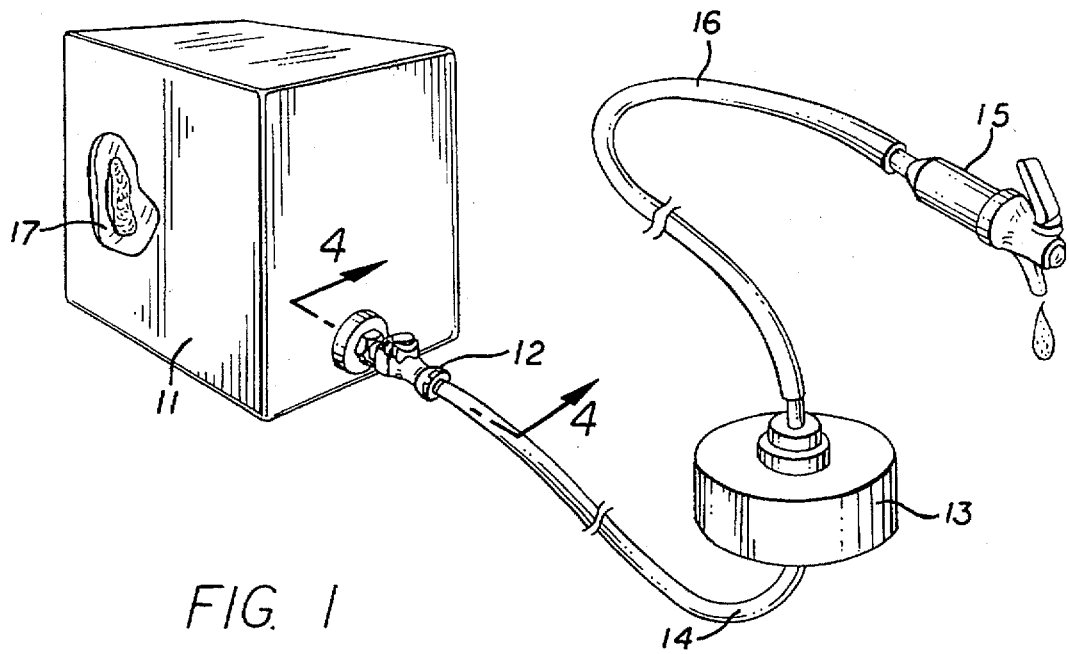
FIG. 1 is a diagrammatic illustration of a condiment dispensing system utilizing a pump and incorporating the presently preferred embodiment of the invention.

A condiment dispensing system is illustrated in FIG. 1, with a bag-in-box 11, a connector 12, a pump 13 connected to the connector 12 by a line 14, and a valve 15 connected to the pump 13 by another line 16. The bag-in-box 11, the pump 13 and the dispensing valve 15 may be conventional. In the bag-in-box 11, a collapsible condiment container 17 is positioned within the box and has a container outlet fitting 18. In an alternative arrangement, the container 17 may be supported in a conventional hanger rather than in a box.

The connector 12 includes a container cap 20, a coupling insert 21, and a coupling body 22. The container cap includes means for mounting the cap on the container outlet fitting. The coupling insert and the container cap have means for attaching the coupling insert to the container cap. The container insert and container body have interengaging means for connecting the two components and for disconnecting the coupling body from the coupling insert. The coupling body has an outlet end 23, typically having several annular barbs 24, for receiving the line 14.

The conventional container outlet fitting 18 has a flat outer face 25 and an annular groove 26. The preferred form for the container cap 20, best seen in FIG. 4, has a flange 27 with a flat outer face 28 and a threaded opening 29. The flange also has an annular rim 30 and an annular rim 31, with the rims being concentric and defining an annular groove 32. The cap is a push fit into the fitting 18, with the annular rim 31 sliding into the annular groove 26 and with the annular rim 30 sliding into the interior of the fitting 18. An annular projection 33 may be provided on the rim 31 for better engagement with the container cap. Both the fitting 18 and the cap 20 may be molded plastic components.

Figure 4:
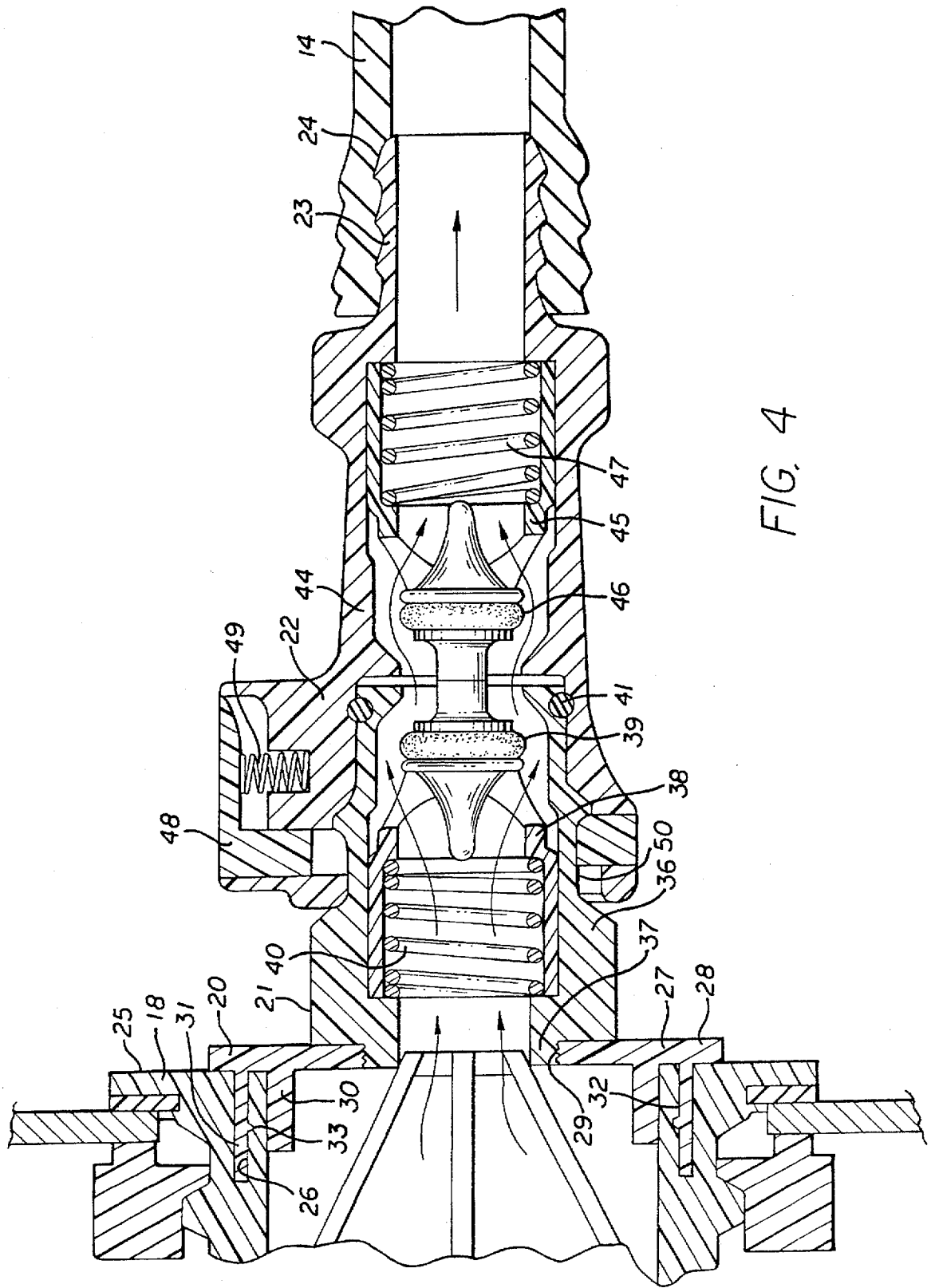
FIG. 4 is a view similar to that of FIG. 3 showing the pump line connected, and is an enlarged sectional view taken along the line 4—4 of FIG. 1.

The coupling insert 21 may be conventional in design, and such coupling inserts are available commercially. The insert has a body 36 with a threaded projection 37 attached to the container cap 20. A poppet 38 with a seal ring 39 is carried in the body 36, and is urged outward, to the right as seen in FIG. 4, by a spring 40 for sealing engagement between the seal ring 39 and body 36. The coupling insert 21 is shown in the open or unsealed position in FIG. 4. An O-ring 41 is carried in a groove at the outer end of the body 36 for sealing with the coupling body 22.

The coupling body 22 may be conventional in design, and also is available commercially. The coupling body includes a housing 44 with a poppet 45 in the housing and carrying a seal 46. A spring 47 urges the poppet to the outward or sealed condition as shown in FIG. 3. A latch ring 48 is carried in the housing 44 and is urged to the latched position as shown in FIG. 4 by a spring 49.

When the coupling body 22 is engaged with the coupling insert 21 as shown in FIG. 4, the latch ring 48 engages a latch groove 50 of the coupling insert, holding the two components together. When the two components are joined together, the outer ends of the poppets 38, 45 engage each other, compressing both springs 40, 47, permitting fluid flow from the interior of the container through the insert 21 and the body 22, into the line 14. The coupling body 22 may be disconnected from the coupling insert 21 by depressing the latch ring 48 to move the ring out of the groove 50. Then the springs 40 and 47 move the corresponding poppets outward to engage the seals 39 and 46 with the body 36 and housing 44, respectively, to seal both the coupling insert and the coupling body.

Figure 5:
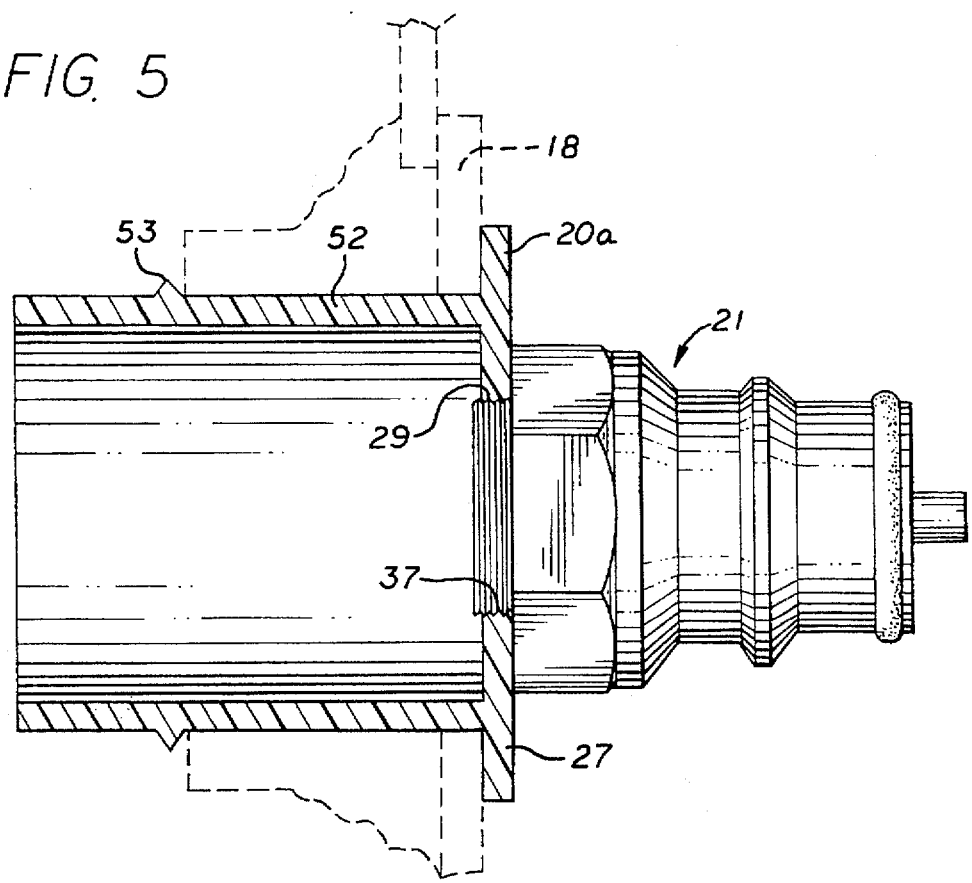
FIG. 5 is a view similar to that of FIGS. 3 and 4 showing an alternative construction for the container cap of the connector of the invention.

An alternative configuration for the container cap is shown in FIG. 5, with a cap 20a having an annular rim or sleeve 52 with an external annular barb 53. The cap 20a has a flange 27 and threaded opening 29 as in the container cap 20. The cap 28 is pushed into the container outlet fitting 18 in the same manner as is the cap 20.

When it is desired to utilize a collapsible container, the closure cap delivered with the filled container is removed from the container outlet fitting, and a container cap 20 with a coupling insert 21 attached, is inserted into the fitting 18. Coupling units 21 may be attached to several containers at a time.

Later, a pump with a coupling body 22 attached thereto directly or by a line 14, is pushed onto the container from which it is desired to dispense material. The pump and coupling body may be moved from one container to another to change the material being dispensed or to move from an empty container to a full container. The customer need only utilize one coupling body 22 for each pump and only a few of the coupling units 21 and container caps 20, while being able to purchase and utilize conventional collapsible containers having the conventional gravity flow container outlet fitting. Thus, with the connector of the invention, the desired aims of reducing costs of components and costs of operation are achieved.

We claim:

1. In a connector for a collapsible container having a container outlet fitting, the combination of:

a container cap having means for mounting said cap on a container outlet fitting;

a coupling insert for attaching to said container cap; and a coupling body, said coupling insert and coupling body having interengaging means for connecting said body to said insert and for disconnecting said body from said insert, said coupling insert having a first poppet valve with a valve seal ring engagable with a valve seat in said coupling insert, and a spring in said coupling insert urging said poppet valve seal ring into engagement with said poppet valve seat, said coupling body having a second poppet valve having a valve seal ring engagable with a valve seat in said coupling body, and a spring in said coupling body urging said poppet valve seal ring into engagement with said poppet valve seat, said first and second said poppet valves having exposed ends positioned for engaging each other when said coupling insert and said coupling body are connected by said interengaging means, said interengaging means including means for latching said coupling body to said coupling insert bringing said popper valve exposed ends into engagement with each other moving each of said poppet valves seal rings out of engagement with the corresponding poppet valve seat permitting fluid flow through said connector, said interengaging means including means for latching said coupling body to said coupling insert bringing said poppet valve exposed ends into engagement permitting fluid flow through said connector and for unlatching said coupling body from said coupling insert with said poppet valve springs pushing said connector body from said connector insert when said body and insert are unlatched and blocking fluid flow through said connector, with said connector body moving only axially relative to said connector insert, with actuation of the poppet valves providing only full flow and zero flow through the connector, said coupling body having an outer end for connection to a hose line, said container cap having a flange with a threaded central opening and said coupling insert having a threaded end for insertion into said threaded opening mounting said coupling insert on said container cap flange, and said container cap means for mounting including a first annular rim projecting from said flange for insertion into said container outlet fitting.

2. A connector as defined in claim 1 wherein said container cap means for mounting further includes a second annular rim concentric with said first annual rim and defining an annular slot for engagement with said container outlet fitting.

* * * * *